United States Patent [19]
Endo et al.

[11] Patent Number: 6,103,896
[45] Date of Patent: Aug. 15, 2000

[54] PROCESS FOR THE PRODUCTION OF METAL PHTHALOCYANINE

[75] Inventors: Atsushi Endo; Yasumasa Suda, both of Tokyo, Japan

[73] Assignee: Toyo Ink Manufacturing Co., Ltd., Tokyo, Japan

[21] Appl. No.: 09/285,067

[22] Filed: Apr. 2, 1999

Related U.S. Application Data

[63] Continuation-in-part of application No. 09/035,769, Mar. 6, 1998, abandoned.

[30] Foreign Application Priority Data

Dec. 27, 1996 [JP] Japan ..................................... 8-349338

[51] Int. Cl.⁷ ............................ C09B 47/06; C09B 47/04
[52] U.S. Cl. ............................................. 540/144; 540/122
[58] Field of Search .............................................. 540/144

[56] References Cited

U.S. PATENT DOCUMENTS

| | | | |
|---|---|---|---|
| 3,074,958 | 1/1963 | Fleysher et al. ..................... | 260/314.5 |
| 5,834,608 | 11/1998 | Maruyama .............................. | 540/144 |

FOREIGN PATENT DOCUMENTS

| | | |
|---|---|---|
| 0 436 311 | 7/1991 | European Pat. Off. . |
| 2 384 826 | 10/1978 | France . |
| 31 06 541 | 10/1982 | Germany . |
| 50-41926 | 8/1973 | Japan . |
| 1 533 354 | 11/1978 | United Kingdom . |

OTHER PUBLICATIONS

*Database WPI*, Section Ch, Week 7543, abstract No. AN 75–71439W (abstract of JP 50–041926) (1975).

*Database WPI*, Section Ch, Week 9614, abstract No. AN 96–136509 (abstract of JP 08–027388) (1996).

*Database WPI*, Section Ch, Week 7718, abstract No. AN 77–31574Y (abstract of JP 52–036130) (1977).

*Database WPI*, Section Ch, Week 7903, abstract No. AN 79–05126B (abstract of JP 53–140329) (1979).

*Primary Examiner*—Mukund J. Shah
*Assistant Examiner*—Pavanaram K Sripada
*Attorney, Agent, or Firm*—Wenderoth, Lind & Ponack, L.L.P.

[57] ABSTRACT

A process for the production of a metal phthalocyanine excellent in color-related properties such as tinting strength, clearness and hue, in which no reactions of raw materials with a solvent take place and a substance harmful to human bodies such as polychlorinated biphenyl (PCB) is not formed, the process comprising heating phthalic anhydride or phthalimide, urea, metal salt and a catalyst in mixed solvents of chlorinated benzene and a linear hydrocarbon.

8 Claims, No Drawings

PROCESS FOR THE PRODUCTION OF METAL PHTHALOCYANINE

This application is a continuation-in-part of now abandoned application, Ser. No. 09/035,769, filed Mar. 6, 1998, now abandoned.

FIELD OF THE INVENTION

Metal phthalocyanines are organic pigments which have a clear hue and high tinting strength and are excellent in various properties such as heat resistance, light resistance and solvent resistance, and the metal phthalocyanines are widely used in the fields of industries of various colorants including printing inks and coating compositions.

A general method of synthesizing a metal phthalocyanine is described, e.g., in "Phthalocyanine Compounds", F. H. Moser and A. L. Thomas, Reinhold, New York, 1963. As a method of synthesizing a metal phthalocyanine, two methods are known if largely classified, such as a method using phthalic anhydride, urea and metal salt as raw materials and a method using phthalonitrile and a metal salt as raw materials. The former method is called "Wyler method" after its discoverer. This method is classified into a solid phase method in which phthalic anhydride, urea, metal salt and a catalyst are melted under heat to synthesize a metal phthalocyanine and a liquid phase method in which the above raw materials are heated in an organic solvent such as chlorinated benzene, nitrobenzene, alkylbenzene or chlorinated naphthalene to synthesize a metal phthalocyanine. When a metal phthalocyanine is synthesized by a solid phase method, generally, the yield and the purity of the metal phthalocyanine are low, and the solid phase method is therefore not suitable for mass production. Of liquid phase methods, the Wyler method is mainly employed in industry since it uses phthalic anhydride as a raw material and can serve to produce a metal phthalocyanine at a lower cost than any other method using phthalonitrile as a raw material.

In general, the properties which a pigment is required to satisfy include color-related properties such as tinting strength, clearness and a hue, durability-related properties such as light resistance, heat resistance, acid resistance, alkali resistance and solvent resistance and suitability-related properties such as dispersibility and flowability. Of these properties that are required, the color-related properties and the durability-related properties are particularly important since they directly affect the qualities of a pigment. It is known that these properties are dependent greatly upon a crude pigment just synthesized, and in view of this point, the conditions of producing a pigment are considered essential.

In the production of a metal phthalocyanine, synthesis conditions are also main factors which control the properties of a pigment. In the Wyler method which is the most industrially frequently employed, it is particularly important what solvent is selected for use. In the Wyler method, it is required to heat the above raw materials in an organic solvent having a high boiling point, such as nitrobenzene, kerosene, alkylbenzene, chlorinated benzene or chlorinated naphthalene, around 200° C. for several hours. Under the above high-temperature condition, phthalic acid or phthalimde, urea and metal salt as raw materials undergo various side reactions with the solvent. By-products formed by the above side reactions cause undesirable effects on the properties, particularly color-related properties, of a metal phthalocyanine as an end product. In particular, it is known that when chlorinated benzene such as trichlorobenzene is used as a solvent, not only by-products formed under heat cause adverse effects on the color-related properties, but also a substance harmful to human bodies, such as polychlorinated biphenyl (PCB), is formed. For this reason, the solvent for the production of a metal phthalocyanine is selected mainly from solvents other than chlorinated benzenes, i.e., from nitrobenzene, kerosene, alkylbenzene, etc., in recent years.

For producing a metal phthalocyanine from the above raw materials, generally, it is required to heat raw materials such as phthalic anhydride or phthalimide, urea, metal salt, a catalyst, etc., in a proper solvent around 200° C. for several hours.

SUMMARY OF THE INVENTION

It is an object of the present invention to provide a process for the production of a metal phthalocyanine, which does not cause side reactions of raw materials with a solvent under heat at a high temperature.

It is another object of the present invention to provide a process for the production of a metal phthalocyanine, which does not cause the formation of by-products and gives a metal phthalocyanine excellent in color-related properties of a pigment, such as tinting strength, clearness, and the like.

It is also another object of the present invention to provide a process for the production of a metal phthalocyanine, which does not cause the side formation of substances harmful to human bodies such as polychlorinated biphenyl (PCB).

According to the present invention, there is provided a process for the production of a metal phthalocyanine, which comprises heating phthalic anhydride or phthalimide, urea, metal salt and a catalyst in mixed solvents of chlorinated benzene and a linear hydrocarbon.

DETAILED DESCRIPTION OF THE INVENTION

For overcoming the above problems which are involved in the production of a metal phthalocyanine from phthalic anhydride or phthalimide as a raw material, the present inventors have made diligent studies on processes for producing a metal phthalocyanine by a liquid phase method. As a result, it has been found that the above problems can be overcome by heating and reacting phthalic anhydride or phthalimide, urea, metal salt and a catalyst in mixed solvents of chlorinated benzene and a linear hydrocarbon, and the present invention has been accordingly completed.

The phthalic anhydride or the phthalimide used in the present invention can be a raw material produced by any method. The molar amount of urea based on the total molar amount of the phthalic anhydride or phthalimide is at least 1.5 times, preferably 2 to 3 times.

The metal salt used in the present invention can be selected from chlorides, oxides, hydroxides, acetates or sulfates of metal such as copper, iron, nickel, cobalt or magnesium. The molar amount of the metal salt based on the total molar amount of the phthalic anhydride or phthalimide is 0.2 to 0.3 times, preferably 0.25 to 0.28 times.

The catalyst can be selected from ammonium molybdate, ammonium phosphomolybdate, molybdenum oxide, ammonium tungstate, ammonium phosphotungstate, titanium tetrachloride, zirconium tetrachloride, arsenic pentoxide or ferric chloride.

A reaction for the synthesis of a metal phthalocyanine is carried out at a temperature between 160° C. and 220° C., preferably between 170° C. and 190° C., for 3 to 8 hours.

The linear hydrocarbon used in the present invention is selected from linear hydrocarbons having 10 to 19 carbon atoms, such as decane, undecane, dodecane, tridecane, tetradecane, pentadecane, hexadecane, heptadecane, octadecane or nonadecane. A linear hydrocarbon having 12 to 16 carbon atoms is particularly preferred. When the number of carbon atoms of the linear hydrocarbon is smaller than the above lower limit, undesirably, there is almost no effect on the prevention of formation of PCB. When the above number of carbon atoms is greater than the above upper limit, undesirably, it is difficult to recover solvents after the reaction.

In addition to the above single compounds, the linear hydrocarbon used in the present invention may be a mixture containing at least two linear hydrocarbons, such as Normal Paraffin M (supplied by Nippon Petrochemicals), Normal Paraffin H (supplied by Nippon Petrochemicals), Normal Paraffin L and Normal Paraffin SL (supplied by Nippon Petrochemicals). The linear hydrocarbon is used in an amount of 1 to 60% by weight, preferably 10 to 30% by weight based on the weight of chlorinated benzene (linear hydrocarbon/chlorinated benzene weight ratio=1 to 60%, preferably 10 to 30%). When the amount of the linear hydrocarbon is greater than the above upper limit, undesirably, the yield of a metal phthalocyanine is low. When the amount of the linear hydrocarbon is smaller than the above lower limit, undesirably, the effect on the inhibition of formation of PCB is insufficient.

In the present invention, it is preferred to add an amine compound, an amide compound or an imide compound such as 1,8-diazabicyclo[5.4.0]-undecene(DBU), N,N-diethylaniline, N-butylaniline, aniline, N,N,N',N'-tetramethyl urea, N,N,N',N'-tetramethyl thiourea, N-methyl-2-pyrrolidone or 1,3-dimethyl-2-imidazolidinone or sulfoxide compound such as dimethyl sulfoxide when the production of a metal phthalocyanine is initiated to obtain a higher restraint effect of the formation of PCB. The amount of the amine compound, the amide compound, the imide compound or the sulfoxide compound per mole of a metal salt is 0.01 to 0.6 mol.

Further, the production of a metal phthalocyanine according to the present invention can be carried out under atmospheric pressure or under elevated pressure. When elevated pressure is employed, the pressure is 10 kg/cm$^2$ or lower, preferably 2 to 5 kg/cm$^2$.

A metal phthalocyanine obtained according to the present invention has a clear hue, and it can be widely used as a colorant for high-grade coating composition, printing ink, plastic product, and the like as it is or after formed into a pigment.

EXAMPLES

The present invention will be further explained with reference to Examples and Comparative Examples hereinafter. In Examples, "part" stands for "part by weight".

Example 1

15.6 Parts of phthalimide, 14.6 parts of urea, 2.48 parts of cuprous chloride and 0.16 part of ammonium molybdate were suspended in mixed solvents of 30.2 parts of trichlorobenzene and 3.4 parts of Normal Paraffin M (supplied by Nippon Petrochemicals). Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 13.55 parts of a copper phthalocyanine pigment (yield 94.1%). Then, the obtained copper phthalocyanine was measured for a polychlorinated biphenyl (PCB) content according to a method described in Journal of Chromatography, 325, 456–461 (1985) to show that it contained no PCB.

Example 2

15.6 Parts of phthalimide, 14.6 parts of urea, 2.48 parts of cuprous chloride, 0.16 part of ammonium molybdate and 0.57 parts of 1,8-diazabicyclo[5.4.0]-7-undecene (DBU) were suspended in mixed solvents of 30.2 parts of trichlorobenzene and 3.4 parts of Normal Paraffin M (supplied by Nippon Petrochemicals). Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 13.64 parts of a copper phthalocyanine pigment (yield 94.7%). Then, the obtained copper phthalocyanine was measured for a polychlorinated biphenyl (PCB) content in the same manner as in Example 1 to show that it contained no PCB.

Example 3

15.6 Parts of phthalimide, 14.6 parts of urea, 2.48 parts of cuprous chloride and 0.16 part of ammonium molybdate were suspended in mixed solvents of 26.9 parts of trichlorobenzene and 6.7 parts of Normal Paraffin M (supplied by Nippon Petrochemicals). Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 13.54 parts of a copper phthalocyanine pigment (yield 94.0%). Then, the obtained copper phthalocyanine was measured for a polychlorinated biphenyl (PCB) content in the same manner as in Example 1 to show that it contained no PCB.

Example 4

15.6 Parts of phthalimide, 14.6 parts of urea, 2.48 parts of cuprous chloride and 0.16 part of ammonium molybdate were suspended in mixed solvents of 23.5 parts of trichlorobenzene and 10.1 parts of Normal Paraffin M (supplied by Nippon Petrochemicals). Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 13.42 parts of a copper phthalocyanine pigment (yield 93.2%). Then, the obtained copper phthalocyanine was measured for a polychlorinated biphenyl (PCB) content in the same manner as in Example 1 to show that it contained no PCB.

Example 5

15.6 Parts of phthalimide, 14.6 parts of urea, 2.48 parts of cuprous chloride and 0.16 part of ammonium molybdate were suspended in mixed solvents of 30.2 parts of trichlorobenzene and 3.4 parts of n-decane. Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the n-decane were distilled off under reduced pressure to obtain a crude product. The crude product was suspended in 280 parts of water, and the suspension was heated at 90° C. for 1 hour and then filtered while it was hot. A remaining solid was washed with water and dried to give 13.26 parts of a copper phthalocyanine pigment (yield 92.1%). Then, the obtained copper phthalocyanine was measured for a polychlorinated biphenyl (PCB) content in the same manner as in Example 1 to show that it contained no PCB.

Example 6

15.6 Parts of phthalimide, 14.6 parts of urea, 2.48 parts of cuprous chloride and 0.16 part of ammonium molybdate were suspended in mixed solvents of 30.2 parts of trichlorobenzene and 3.4 parts of Normal Paraffin M (supplied by Nippon Petrochemicals). Then, the mixture was heated with stirring and temperature-increased up to 190° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.1 parts of a copper phthalocyanine pigment (yield 98.0%). Then, the obtained copper phthalocyanine was measured for a polychlorinated biphenyl (PCB) content in the same manner as in Example 1 to show that it contained 5.8 ppm of PCB.

Example 7

15.6 Parts of phthalimide, 14.6 parts of urea, 2.48 parts of cuprous chloride, 0.16 part of ammonium molybdate and 0.57 parts of 1,8-diazabicyclo[5.4.0]-7-undecene (DBU) were suspended in mixed solvents of 30.2 parts of trichlorobenzene and 3.4 parts of Normal Paraffin M (supplied by Nippon Petrochemicals). Then, the mixture was heated with stirring and temperature-increased up to 190° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.2 parts of a copper phthalocyanine pigment (yield 98.5%). Then, the obtained copper phthalocyanine was measured for a polychlorinated biphenyl (PCB) content in the same manner as in Example 1 to show that it contained no PCB.

Example 8

15.6 Parts of phthalimide, 14.6 parts of urea, 2.48 parts of cuprous chloride, 0.16 part of ammonium molybdate and 3.2 parts of N-butylaniline were suspended in mixed solvents of 30.2 parts of trichlorobenzene and 3.4 parts of Normal Paraffin M (supplied by Nippon Petrochemicals). Then, the mixture was heated with stirring and temperature-increased up to 190° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.04 parts of a copper phthalocyanine pigment (yield 97.5%). Then, the obtained copper phthalocyanine was measured for a polychlorinated biphenyl (PCB) content in the same manner as in Example 1 to show that it contained no PCB.

Example 9

15.6 Parts of phthalimide, 14.6 parts of urea, 2.48 parts of cuprous chloride, 0.16 part of ammonium molybdate and 3.2 parts of N,N,N',N'-tetramethyl urea were suspended in mixed solvents of 30.2 parts of trichlorobenzene and 3.4 parts of Normal Paraffin M (supplied by Nippon Petrochemicals). Then, the mixture was heated with stirring and temperature-increased up to 190° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.08 parts of a copper phthalocyanine pigment (yield 97.8%). Then, the obtained copper phthalocyanine was measured for a polychlorinated biphenyl (PCB) content in the same manner as in Example 1 to show that it contained no PCB.

Example 10

15.6 Parts of phthalimide, 14.6 parts of urea, 2.48 parts of cuprous chloride, 0.16 part of ammonium molybdate and 3.2 parts of N-methyl-2-pyrrolidone were suspended in mixed solvents of 30.2 parts of trichlorobenzene and 3.4 parts of Normal Paraffin M (supplied by Nippon Petrochemicals). Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.05 parts of a copper phthalocyanine pigment (yield 97.6%). Then, the obtained copper phthalocyanine was measured for a polychlorinated biphenyl (PCB) content in the same manner as in Example 1 to show that it contained no PCB.

Example 11

15.6 Parts of phthalimide, 14.6 parts of urea, 2.48 parts of cuprous chloride, 0.16 part of ammonium molybdate and 3.2 parts of dimethyl sulfoxide were suspended in mixed solvents of 30.2 parts of trichlorobenzene and 3.4 parts of Normal Paraffin M (supplied by Nippon Petrochemicals).

Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the Normal Paraffin M were distilled off under reduced pressure to obtain a crude product. The crude product was suspended in 280 parts of water, and the suspension was heated at 90° C. for 1 hour and then filtered while it was hot. A remaining solid was washed with water and dried to give 14.05 parts of a copper phthalocyanine pigment (yield 97.5%). Then, the obtained copper phthalocyanine was measured for a polychlorinated biphenyl (PCB) content in the same manner as in Example 1 to show that it contained no PCB.

Comparative Example 1

15.6 Parts of phthalimide, 14.6 parts of urea, 2.48 parts of cuprous chloride and 0.16 part of ammonium molybdate were suspended in mixed solvents of 30.2 parts of trichlorobenzene and 3.4 parts of 2,2,4,6,6-pentamethylheptane. Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the 2,2,4,6,6-pentamethylheptane were distilled off under reduced pressure to obtain a crude product. The crude product was suspended in 280 parts of water, and the suspension was heated at 90° C. for 1 hour and then filtered while it was hot. A remaining solid was washed with water and dried to give 13.23 parts of a copper phthalocyanine pigment (yield 91.9%). Then, the obtained copper phthalocyanine was measured for a polychlorinated biphenyl (PCB) content in the same manner as in Example 1 to show that it contained 30.3 ppm of PCB.

Comparative Example 2

15.6 Parts of phthalimide, 14.6 parts of urea, 2.48 parts of cuprous chloride and 0.16 part of ammonium molybdate were suspended in 33.6 parts of trichlorobenzene. Then, the mixture was heated with stirring and temperature-increased up to 180° C. over 1 hour. At this temperature, the mixture was allowed to react for 5 hours. Then, the reaction mixture was cooled to room temperature, and the trichlorobenzene was distilled off under reduced pressure to obtain a crude product. The crude product was suspended in 280 parts of water, and the suspension was heated at 90° C. for 1 hour and then filtered while it was hot. A remaining solid was washed with water and dried to give 13.51 parts of a copper phthalocyanine pigment (yield 93.8%). Then, the obtained copper phthalocyanine was found to contain harmful substance. It was measured for a polychlorinated biphenyl (PCB) content in the same manner as in Example 1 to show that it contained 43.1 ppm of PCB.

Comparative Example 3

15.6 Parts of phthalimide, 14.6 parts of urea, 2.48 parts of cuprous chloride and 0.16 part of ammonium molybdate were suspended in mixed solvents of 30.2 parts of trichlorobenzene and 3.4 parts of kerosene. Then, the mixture was heated with stirring and temperature-increased up to 180° C. over 1 hour. At this temperature, the mixture was allowed to react for 5 hours. Then, the reaction mixture was cooled to room temperature, and the trichlorobenzene and the kerosene were distilled off under reduced pressure to obtain a crude product. The crude product was suspended in 280 parts of water, and the suspension was heated at 90° C. for 1 hour and then filtered while it was hot. A remaining solid was washed with water and dried to give 13.7 parts of a copper phthalocyanine pigment (yield 95.1%). Then, the obtained copper phthalocyanine was measured for a polychlorinated biphenyl (PCB) content in the same manner as in Example 1 to show that it contained 18.8 ppm of PCB.

0.5 Gram of the copper phthalocyanine obtained in one of the above Examples and Comparative Examples and 1.0 g of linseed oil were kneaded with a Hoover muller by repeating 100 turns four times to obtain an ink, and 0.2 g of the ink and a white ink prepared by kneading titanium oxide and linseed oil in a weight ratio of 1:1 were used to prepare a tinting shade ink. The tinting shade ink was applied in between cellophane paper sheets and measured for color values X, Y and Z with a color meter (supplied by Suga Test Instruments Co., Ltd.). L*, a* and b* used in CIELAB were calculated on the basis of the measured color values according to the following equations, and C* was calculated on the basis of a* and b*.

$$L^* = 116(Y/Y_0)^{1/3} - 16$$

$$a^* = 500[(X/X_0)^{1/3} - (Y/Y_0)^{1/3}]$$

$$b^* = 200[(Y/Y_0)^{1/3} - (Z/Z_0)^{1/3}]$$

$$C^* = [(a^*)^2 + (b^*)^2]^{1/2}$$

In the above equations, $X_0$, $Y_0$ and $Z_0$ are three excitation values of a light source, and those of a C light source used in Examples were the following values.

$X_0 = 98.075$
$Y_0 = 100.0000$
$Z_0 = 118.2246$

L* corresponds to a luminosity, and the smaller the value of L* is, higher the tinting strength of a tested pigment is. C* corresponds to a clearness, and the greater the value of C* is, higher the clearness of a tested pigment is. Table 1 shows yields, PCB contents in pigments and color values L* and C* with regard to the pigments obtained in Examples. Table 2 show those values of the pigments obtained in Comparative Examples.

TABLE 1

| Example | Yield (%) | PCB content (ppm) | L* | C* |
|---------|-----------|-------------------|------|------|
| 1 | 94.1 | 0 | 51.3 | 39.1 |
| 2 | 94.7 | 0 | 51.1 | 39.5 |
| 3 | 93.8 | 0 | 51.8 | 38.7 |
| 4 | 93.2 | 0 | 52.0 | 38.2 |
| 5 | 92.1 | 0 | 52.4 | 38.1 |
| 6 | 98.0 | 5.8 | 51.0 | 40.3 |
| 7 | 98.5 | 0 | 51.1 | 40.2 |
| 8 | 97.5 | 0 | 51.3 | 39.8 |
| 9 | 97.8 | 0 | 51.4 | 39.9 |
| 10 | 97.6 | 0 | 51.2 | 40.0 |
| 11 | 97.5 | 0 | 51.5 | 39.6 |

TABLE 2

| Comparative Example | Yield (%) | PCB content (ppm) | L* | C* |
|---------|-----------|-------------------|------|------|
| 1 | 91.9 | 30.3 | 54.1 | 36.6 |
| 2 | 94.0 | 43.1 | 53.3 | 37.8 |
| 3 | 95.1 | 18.8 | 53.0 | 38.1 |

The above Tables 1 and 2 show the following. On the basis of L* and C* values, the pigments obtained in Examples 1 to 5 are all excellent in both tinting strength and clearness over the pigments obtained in Comparative Examples 1 and 2.

The metal phthalocyanine produced according to the present invention are excellent in color-related properties such as tinting strength and clearness, and it is a high-purity pigment which does not contain any by-products such as polychlorinated biphenyl (PCB) caused by side reactions of its raw materials with chlorinated benzene used as a solvent. It can be therefore used in a broad range of fields.

What is claimed is:

1. A process for the production of a metal phthalocyanine, which comprises heating phthalic anhydride or phthalimide, urea, metal salt and a catalyst in mixed solvents of chlorinated benzene and a linear hydrocarbon and wherein at least one compound selected from the group consisting of 1,8-diazabicyclo(5.4.0)-undecene, N,N-diethylaniline, N-butylaniline, aniline, N,N,N',N'-tetramethyl urea N,N,N', N'-tetramethyl thiourea, N-methyl-2-pyrrolidone, 1,3-dimethyl-2-imidazolidinone and dimethyl sulfoxide is further added in an amount of 0.01 to 0.6 mol per mole of the metal salt.

2. The process according to claim 1, wherein the chlorinated benzene is trichlorobenzene.

3. The process according to claim 1, wherein the linear hydrocarbon is a linear hydrocarbon having 10 to 19 carbon atoms.

4. The process according to claim 1, wherein the linear hydrocarbon is a linear hydrocarbon having 12 to 16 carbon atoms.

5. The process according to claim 1, wherein the mixed solvents contain 1 to 60% by weight, based on the weight of chlorinated benzene, of the linear hydrocarbon.

6. The process according to claim 1, wherein the mixed solvents contain 10 to 30% by weight, based on the weight of chlorinated benzene, of the linear hydrocarbon.

7. The process according to claim 1, wherein the phthalic anhydride or phthalimide, the urea, the metal salt and the catalyst are heated at a temperature between 160° C. and 220° C.

8. The process according to claim 1, wherein the phthalic anhydride or phthalimide, the urea, the metal salt and the catalyst are heated at a temperature between 170° C. and 190° C.

* * * * *